No. 794,569. PATENTED JULY 11, 1905.
W. L. THOMAS.
PROTRACTOR.
APPLICATION FILED JUNE 28, 1904.
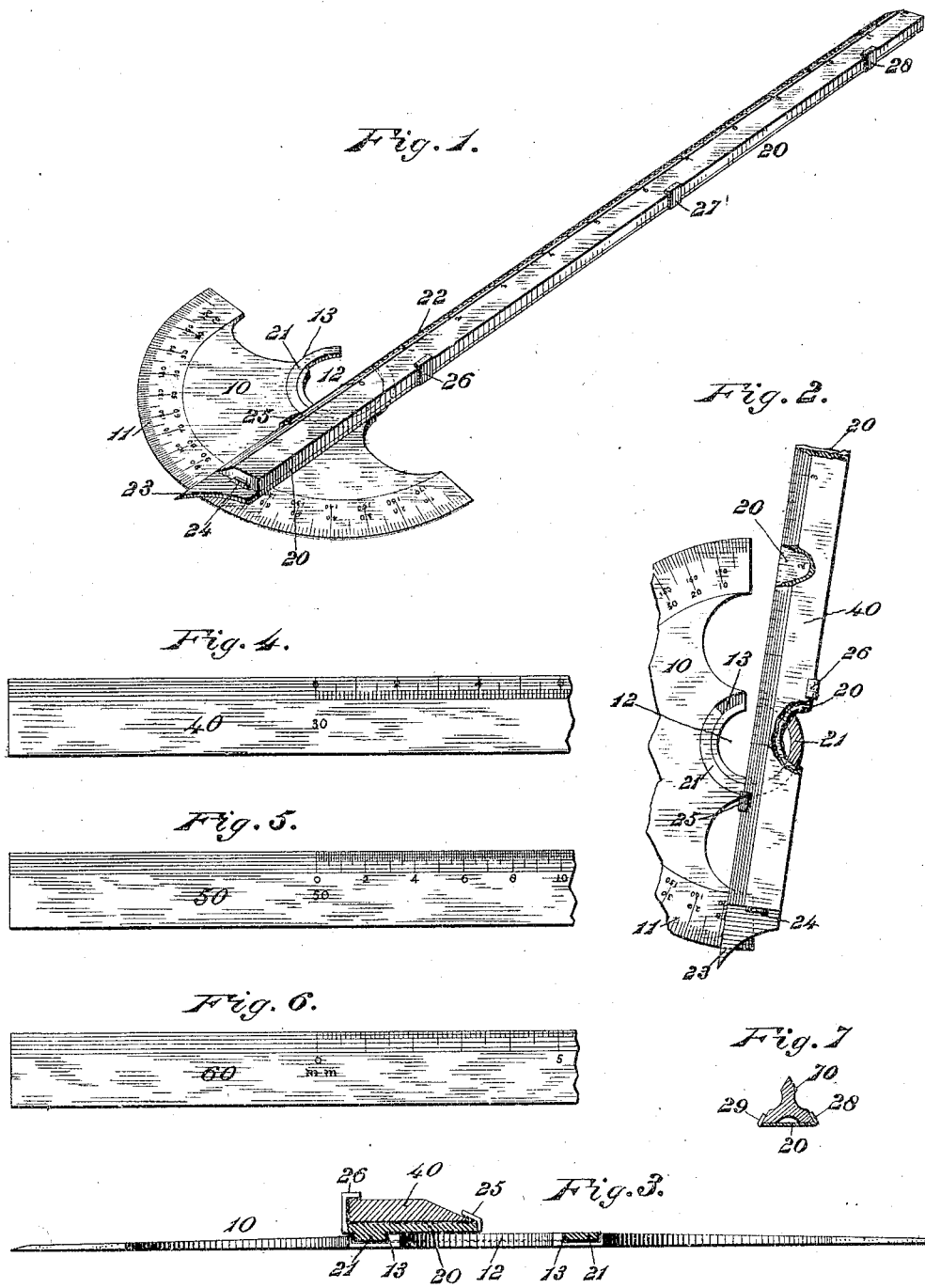

No. 794,569.

Patented July 11, 1905.

UNITED STATES PATENT OFFICE.

WILLIAM L. THOMAS, OF BEAUMONT, TEXAS.

PROTRACTOR.

SPECIFICATION forming part of Letters Patent No. 794,569, dated July 11, 1905.

Application filed June 28, 1904. Serial No. 214,450.

*To all whom it may concern:*

Be it known that I, WILLIAM L. THOMAS, a citizen of the United States of America, residing at Beaumont, in the county of Jefferson, in the State of Texas, have invented certain new and useful Improvements in Protractors, of which the following is a specification.

The principal object of this invention is to provide an instrument of this character adapted for the making of maps on different scales, this object being accomplished by a plurality of rulers graduated at different scales interchangeable one with another and respectively connected with the arm of the protractor.

Another object of the invention is to provide an improved construction which secures an accurate and direct register of the rule with the degrees of the protractor-circle and affords a continuous rule edge outward from the zero-point of the rule at the center of the circle.

Figure 1 of the accompanying drawings represents a perspective view of one form of the device complete. Fig. 2 represents a top plan view with the ruler arranged in a different position from that shown in Fig. 1, parts being broken away to economize space. Fig. 3 represents, on an enlarged scale, a transverse section of the device, showing the base or protractor plate in rear elevation. Fig. 4 represents a plan of a fragment of a detachable ruler adaptable for use as a part of this instrument graduated to a scale of one-thirtieth of an inch. Fig. 5 represents a fragment of a similar adjustable or interchangeable ruler provided with graduations on a scale of one-fiftieth of an inch. Fig. 6 represents a similar view of a fragment of another interchangeable ruler graduated under the metric scale. Fig. 7 represents a transverse section showing a triangular scale.

The same reference-numbers indicate corresponding parts in all the figures.

This instrument comprises in its preferred form a base protractor-plate 10, a swiveling protractor-arm 20, movable over said protractor-plate and adapted to serve as a ruler in connection therewith, and a supplemental ruler, as 30, 40, or 50, detachably mounted on said protractor-arm 20. The base-plate 10 may be of any suitable form provided with a graduated protractor-arc 11, divided into degrees of a circle and fractions thereof and having at the center of the circle of said arc a recess or open free space 12. This base-plate is also provided between the graduated arc 11 and the open free space 12, preferably adjacent to the latter, with an arc-shaped guide 13 concentric with said protractor-arc and preferably in the form of a groove.

The protractor-arm 20 is provided near one end with an arc-shaped member 21, preferably composed of metal and fixed rigidly to said arm and adapted to fit and slide in the guide or groove 13 of the base and being held therein by friction or otherwise. This protractor-arm comprises a straight ruler, preferably provided on one side with a beveled edge 22, the shorter portion on one side of the circle center being adapted to ride over the protractor-arc and register directly with the graduations thereof and the longer portion on the other side of the circle center being in line with said shorter portion and having a continuous unobstructed ruler edge from a point at or on one side of the circle center outward throughout the length of the ruler on the other side thereof. The left-hand end of the protractor-arm is preferably tapered from its front to its rear edge, forming a projecting point 23, which may be grasped by the thumb and finger of the left hand for adjusting the arm on the protractor-scale. The protractor-arm may be graduated at any desired scale and itself serve as a ruler in connection with the protractor, the zero of the ruler-scale being at the center of the protractor-circle. This protractor-arm is preferably provided near its left-hand end with a stop 24 on its upper face and also with means for detachably clamping or holding a detachable ruler. The means shown for holding one of the detachable or interchangeable rulers upon the arm 20 may be in the form of spring-clips, as 25 26 27 28, disposed on opposite sides of said arm and bent into position to overlap and grasp or clamp the opposite edges of such ruler. A plurality of rulers, as 40, 50, and 60, having graduations on different scales, respectively, may be interchangeable one with another and either detachably connected at different times with the protractor-arm 20 for producing maps on different scales. Each of these detachable or supplemental rulers is provided on its front side with a beveled edge which coincides with the beveled edge of the protractor-arm 20, and the zero-point of these interchangeable rulers is so arranged with reference to the stop 24 on the arm 20 as to bring said zero-point exactly in register with the center of the protractor-circle. When it is desired to use a different scale from that marked on the protractor-arm 20 itself, one of the several rulers having the desired scale is slipped under the clamps or clips on said arm up against the stop 24, as shown in Fig. 1, and when another or different scale is desired this ruler is removed and another one having the desired scale is put in place thereof. In lieu of the flat beveled-edge rulers 40, 50, and 60 a triangular six-scale ruler 70 may be used, the spring-clips 25 to 29 being bent to accommodate said ruler, as shown in Fig. 7.

In the use of this instrument the swiveling arm 20 is adjusted by means of the arc-shaped member 21 in the guide 13 of the base or protractor plate 10, and then the operator grasping the pointed handle 23 swings the protractor-arm 20 into position to bring its active edge to coincide with the desired degree, minute, or second graduation on the scale of the protractor-arc 11. Then the draftsman places his pencil at the zero-point of the scale exactly at the center of the protractor-arc and draws his line with a single stroke easily, rapidly, and continuously from said initial or zero point the full desired length on the ruler-scale. In this construction the edge of the ruler registers directly with the graduations of the protractor-scale, and the ruler edge, which may be continuous with said graduations, affords an unobstructed passage for the pencil.

I claim as my invention—

1. In a protractor the combination of a base-plate having a graduated segmental protractor-arc extending through a portion only of the protractor-circle, an open free space at the center of said circle, and an arc-shaped guide concentric with said arc, and a swiveling protractor-arm provided with an arc-shaped member adapted to fit said arc-shaped guide and forming a hub-support for said swiveling arm, said arm comprising a short portion projecting beyond said arc-shaped member on one side of the circle center and riding over the graduated arc on the base-plate and adapted to register with the graduations thereof, and an elongated ruler portion projecting beyond said arc-shaped member on the other side of said circle center, said arm having a continuous unobstructed ruler edge from said circle center outward beyond the circumference of said circle and having its zero-point disposed always at the center of said circle.

2. A protractor having a graduated protractor-arc, a swiveling arm provided with a fixed stop disposed on one side of the center of the protractor-circle, and a ruler adjustable on said arm and adapted to engage said stop to bring its zero-point always at the center of said circle.

3. In a protractor the combination of a base-plate having a graduated segmental protractor-arc extending through a portion only of the protractor-circle, an open free space at the center of said circle, and an arc-shaped guide concentric with said arc, and disposed near the center of said protractor-circle, a swiveling protractor-arm provided with an arc-shaped member adapted to fit said arc-shaped guide, and forming a supporting-hub for said arm, said arm comprising a short portion on one side of the circle center adapted to ride over said graduated arc and register directly with the graduations thereof, and a detachable ruler mounted on said swiveling arm and having a continuous unobstructed ruler edge from said circle center outward on the other side of said center beyond the circumference of said circle and having its zero-point disposed always at the circle center.

WILLIAM L. THOMAS.

Witnesses:
GRACE MANSO,
H. M. DOUGLASS.